(12) United States Patent
Schaefer

(10) Patent No.: US 11,292,069 B2
(45) Date of Patent: Apr. 5, 2022

(54) SOLDERING SYSTEM WITH MONITORING UNIT

(71) Applicant: ERSA GmbH, Wertheim (DE)

(72) Inventor: Michael Schaefer, Kuelsheim (DE)

(73) Assignee: ERSA GmbH, Wertheim (DE)

( * ) Notice: Subject to any disclaimer, the term of this patent is extended or adjusted under 35 U.S.C. 154(b) by 73 days.

(21) Appl. No.: 16/622,724

(22) PCT Filed: Jul. 2, 2018

(86) PCT No.: PCT/EP2018/067751
§ 371 (c)(1),
(2) Date: Dec. 13, 2019

(87) PCT Pub. No.: WO2019/011687
PCT Pub. Date: Jan. 17, 2019

(65) Prior Publication Data
US 2020/0101548 A1  Apr. 2, 2020

(30) Foreign Application Priority Data
Jul. 11, 2017 (DE) .......................... 102017115534.1

(51) Int. Cl.
*B23K 3/00* (2006.01)
*B23K 3/06* (2006.01)
*B23K 1/08* (2006.01)
*B23K 1/20* (2006.01)

(52) U.S. Cl.
CPC ............ *B23K 3/0653* (2013.01); *B23K 1/085* (2013.01); *B23K 1/203* (2013.01)

(58) Field of Classification Search
CPC ...... B23K 3/0653; B23K 1/085; B23K 1/203; B23K 31/125; B23K 1/00–206; B23K 3/00–087
USPC ........... 228/102–105, 8–12, 256–262, 33, 37
See application file for complete search history.

(56) References Cited

U.S. PATENT DOCUMENTS

| | | | | |
|---|---|---|---|---|
| 4,467,638 A | * | 8/1984 | Greenstein ............ | G01N 13/00 228/103 |
| 4,529,116 A | * | 7/1985 | Gutbier ................ | B23K 3/0653 228/103 |
| 5,005,766 A | * | 4/1991 | Heiner .................. | B23K 3/082 239/214 |
| 5,023,848 A | * | 6/1991 | Frey ...................... | B23K 1/085 368/1 |
| 5,388,468 A | * | 2/1995 | Sasson .................. | B23K 1/085 228/56.5 |

(Continued)

FOREIGN PATENT DOCUMENTS

| | | | |
|---|---|---|---|
| CN | 203843337 U | * | 9/2014 |
| DE | 202006009139 U1 | | 9/2006 |

(Continued)

OTHER PUBLICATIONS

Machine translation of CN-203843337U (no date available).*

(Continued)

*Primary Examiner* — Kiley S Stoner
(74) *Attorney, Agent, or Firm* — Bond Schoeneck & King, PLLC; George McGuire

(57) ABSTRACT

The invention relates to a soldering system and a method for wave soldering, having at least one flux nozzle and a device for monitoring a state of a spray jet of the flux nozzle.

9 Claims, 2 Drawing Sheets

(56) References Cited

U.S. PATENT DOCUMENTS

| | | | | |
|---|---|---|---|---|
| 5,533,663 | A | * | 7/1996 | Massini, Jr .......... B23K 3/0653 228/103 |
| 5,538,175 | A | * | 7/1996 | Massini, Jr .......... B23K 3/0653 228/102 |
| 6,415,972 | B1 | * | 7/2002 | Leap ................... B23K 3/0653 228/102 |
| 2008/0145541 | A1 | * | 6/2008 | Williams ............. H05K 3/3489 427/282 |
| 2011/0139855 | A1 | * | 6/2011 | Ristolainen ........... B23K 1/085 228/102 |
| 2014/0298898 | A1 | * | 10/2014 | Yang ................... B23K 1/0016 73/150 R |
| 2020/0095685 | A1 | * | 3/2020 | Han ................... C23C 18/1637 |

FOREIGN PATENT DOCUMENTS

| | | |
|---|---|---|
| DE | 102004063488 A1 | 12/2006 |
| DE | 19900599 B4 | 6/2011 |
| JP | 62267065 A * 11/1987 | .......... B23K 3/0646 |
| JP | H01205593 A | 8/1989 |
| JP | H07131143 A | 5/1995 |
| JP | H10193092 A | 7/1998 |
| WO | 2007106982 A1 | 9/2009 |
| WO | 2014049340 A2 | 4/2014 |

OTHER PUBLICATIONS

German Exam Report, pp. 1-5.
International Search Report and Non-Translated Written Opinion Form PCT/IS/210 and PCT/ISA/237, International Application No. PCT/EP2018/067751, pp. 1-6, International Filing Date Jul. 2, 2018, mailing date of search report dated Jan. 4, 2019.
DE Office Communication, dated Dec. 10, 2021, pp. 1-6.

* cited by examiner

SOLDERING SYSTEM WITH MONITORING UNIT

CROSS-REFERENCES TO RELATED APPLICATIONS

This application is the U.S. National Stage application of PCT/EP2018/067751, filed Jul. 2, 2018, which claims priority to German Patent Application No. 10 2017 115 534.1, filed on Jul. 11, 2017, the disclosure of each of which is incorporated herein by reference in its entirety.

BACKGROUND OF THE INVENTION

The invention relates to a soldering system for selective wave soldering, comprising at least one flux nozzle and a device for monitoring a state of a spray jet of the flux nozzle. The invention further relates to a soldering system comprising at least one solder pot having at least one soldering nozzle and a device for monitoring a state of a standing wave (14) of the soldering nozzle. The invention also relates to a method for monitoring a state of a spray jet of a flux nozzle and/or a standing wave.

In soldering systems for selective wave soldering, in a solder pot, liquid solder from a solder reservoir is conveyed out of the solder reservoir through a soldering nozzle of the solder pot by means of a solder pump such that the liquid solder discharges through the soldering nozzle arranged at the top of the solder pot as a standing wave.

In soldering systems, flux is also applied to the workpieces to be processed, prior to soldering, using so-called flux nozzles in order to improve wetting of the workpieces by the solder. A spray jet of the flux discharges out of the flux nozzle and is directed onto the workpieces.

In soldering systems for selective wave soldering, it is known to movably arrange both the solder pot and the soldering nozzles arranged thereon as well as the flux nozzles having a variety of axial drives in a working space such that the soldering nozzles and the flux nozzles can be moved relative to a circuit board to be processed.

When using soldering nozzles and flux nozzles, contamination or the like can lead to a spray jet or a standing wave no longer having the desired shape or no longer being directed onto the desired position, for example due to contamination of the soldering nozzles or flux nozzles.

In this case, monitoring a spray jet of a flux nozzle which has a diameter of less than 5 mm is known from the prior art, for example, with the flux nozzle being moved into a test position. A laser apparatus is arranged in this case in the region of the test position, which laser apparatus emits a laser beam which is interrupted by the spray jet of the flux nozzle when the flux nozzle is correctly positioned, so that this interruption can be detected, it thereby being possible to conclude that the spray jet is in a proper position.

However, this type of spray jet monitoring can only be used with very thin spray jets, as spray jets which wet a larger surface area, e.g. having a diameter of from 25 to 30 mm, cannot be monitored. Wide spray jets of this kind leave the flux nozzle in the shape of a fan, and therefore it is not possible to draw a conclusion on the position of the spray jet, but instead it is only possible to draw a conclusion on whether a spray jet is actually present.

In the case of soldering nozzles, there is currently only the possibility of optically inspecting the soldering nozzles. Automated monitoring of the soldering nozzles is not known as of yet.

WO/2007/106982 A1 discloses a method in which spray parameters of in particular fuel injection nozzles are recognized by means of computer-based optical pattern recognition. In this case, an optical plane (planar laser sheet) is generated by means of a planar laser, through which plane the spray jet passes.

JP H07-131 143 A discloses a wave soldering system in which a camera is used to determine the height of the solder wave.

DE 199 00 599 B4 discloses a wave soldering system and an associated method, which comprises a curvature detecting device by means of which a curvature value of the workpiece can be detected.

SUMMARY OF THE INVENTION

The problem addressed by the invention is that of developing a device of the type mentioned at the outset in such a way that a simple and reliable way of monitoring a spray jet and/or a standing wave is created that is independent of the diameter of the spray jet and/or the standing wave.

This problem is solved by a device for a soldering system for selective wave soldering and has a test surface which has an upper face and a lower face and is designed such that a shape and/or position of the spray jet and/or a shape and/or position of the standing wave can be imaged on the upper face of the test surface by bringing the spray jet and/or the standing wave into contact with the lower face of the test surface. The device further comprises a camera, in particular a digital camera, which is designed to detect the shape and/or position of the spray jet that is imaged on the upper face of the test surface and/or the shape and/or position of the standing wave that is imaged on the test surface. In this case it is conceivable for the shape and/or position of the spray jet or the standing wave that is detected by the camera to be further processed by means of image processing in a control apparatus, for example in a control apparatus of a soldering system for selective wave soldering, and for information about the state of the spray jet or the standing wave to be output to an operator of the soldering system.

In this case the camera is arranged above the upper face of the test surface. It is particularly preferred if the camera is arranged at a defined distance from the test surface.

Advantageously, the device is designed to monitor a spray jet of a flat flux nozzle and/or to monitor a standing wave of a flat soldering nozzle.

It is also advantageous if the test surface is planar. In this case it is conceivable for the test surface to be arranged in a plane which is arranged orthogonally with respect to the direction of the spray jet and/or the standing wave or with respect to a central axis of a flux nozzle and/or a soldering nozzle.

The test surface is a tensioned paper web. Contamination or clogging of a flux nozzle can therefore be detected, for example, by imaging the spray jet on the paper web. It is advantageously possible to deduce clogging and/or contamination of the flux nozzle from a shape and/or position of the spray jet that is imaged on the test surface, it being possible to deduce the amount of flux applied through the flux nozzle from the size of the shape of the spray jet that is imaged on the test surface.

The paper of the paper web is advantageously designed such that the shape and/or position of the spray is imaged on the upper face of the paper web by wetting the paper web from the lower face by means of the spray jet, by producing a color contrast between wetted regions of the paper web and unwetted regions of the paper web. Advantageously, a paper is used which is not too light, but also not too dark. An absorbency and a thickness of the paper are also correspondingly selected. It is particularly preferred if the paper is thermal paper and/or blue paper. The use of blue paper has proven to be advantageous for producing a sufficient color contrast when the spray jet substantially comprises water. The use of thermal paper has proven to be advantageous when the spray jet comprises alcohol.

It is particularly preferred if a winding apparatus is provided which comprises a first roller and a second roller, between which the paper web is tensioned. In this case it is conceivable for the paper web to be unwound from the first roller onto the second roller or vice versa.

Advantageously, an apparatus is provided which is designed to change a distance of the two preferably mutually parallel rollers such that the tension of the paper web can be adjusted. In this case it is conceivable for the apparatus to be designed to manually or automatically change the distance between the two rollers.

In order to allow the paper web to be unwound in the simplest possible manner, it has proven to be advantageous if an electric motor is provided which is designed to drive at least one of the rollers. "Driving" is in this case understood to mean a rotation of the rollers about their central longitudinal axis. Advantageously, the electric motor is connected to a central control apparatus, the control apparatus controlling the electric motor such that the tension of the paper web can be adjusted by means of the electric motor.

The test surface is a transparent plate, in particular a glass plate. Using a glass plate of this kind, it is possible to bring a standing wave, in particular a standing wave of a soldering nozzle for selective wave soldering, into contact with the lower face of the transparent plate such that the shape and/or position of the standing wave is imaged on the upper face of the transparent plate. Contamination of a soldering nozzle can thus also be detected, for example. However, it is also possible to detect whether a soldering nozzle is supplied with the pumping power provided for the soldering nozzle.

When monitoring the state of a standing solder wave, it has proven to be particularly advantageous if a lighting apparatus is provided in the edge region of the transparent plate, which lighting apparatus lights the transparent plate from the lower face. Therefore, when monitoring the state of a standing solder wave, contours of the solder wave (so-called coronas) can be made visible by the reflective solder and the lighting apparatus, since reflections which can be detected by the camera are produced in edge regions in which the solder wave contacts the transparent plate.

In order to be able to allow automated monitoring of the state of the spray jet and/or the standing wave, it has proven to be advantageous if the device has a control apparatus which is designed to store a desired shape and/or a desired position of the spray j et and/or to store a desired shape and/or a desired position of the standing wave, the control apparatus being designed to compare the desired shape and/or desired position with the detected shape and/or position of the spray jet and/or the standing wave.

The problem mentioned at the outset is also solved by a method that comprises the following steps: bringing the spray jet and/or the standing wave into contact with a lower face of a test surface such that a shape and/or position of the spray jet and/or a shape and/or position of the standing wave is imaged on an upper face of the test surface; detecting the shape and/or position of the spray j et that is imaged on the upper face of the test surface and/or the shape and/or position of the standing wave that is imaged on the test surface by means of a camera. The shape and/or position of the spray jet or the standing wave is advantageously detected by means of a digital camera. In this case it is conceivable for the shape and/or position of the spray jet or the standing wave that is detected by the camera to be further processed by means of image processing in a control apparatus, for example in a control apparatus of a soldering system for selective wave soldering. Advantageously, the soldering nozzle is positioned at a distance to the test surface that corresponds to a desired height of the standing wave. Due to the shape and/or position imaged on the test surface, it is therefore also possible to draw a conclusion, for example by means of digital image processing, on the height of the standing wave.

It is particularly preferred if the detected shape and/or position of the spray jet and/or the detected shape and/or position of the standing wave is compared with a desired shape and/or a desired position of the spray jet and/or the standing wave. The desired shape and/or desired position is advantageously stored in a control apparatus beforehand.

According to a first alternative of the method, a tensioned paper web is used as the test surface, the shape and/or position of the spray jet being imaged on the upper face of the paper web by wetting the paper web from the lower face by means of the spray jet, by producing a color contrast between wetted regions of the paper web and unwetted regions of the paper web.

According to a second alternative of the method, a transparent plate, in particular a glass plate, is used as the test surface.

Advantageously, the flux nozzle and/or the soldering nozzle is moved from a working position into a test position for monitoring the state of the flux nozzle and/or the soldering nozzle. A device for monitoring the spray jet and/or the standing wave in a soldering system for selective wave soldering can therefore be mounted or arranged outside a working region, the flux nozzle or soldering nozzle only having to be moved from the working position into the test position for monitoring or checking the state.

Further details and advantageous embodiments can be found in the following description, with reference to which two embodiments of the invention will be described and explained in greater detail.

DETAILED DESCRIPTION

Figure 1:
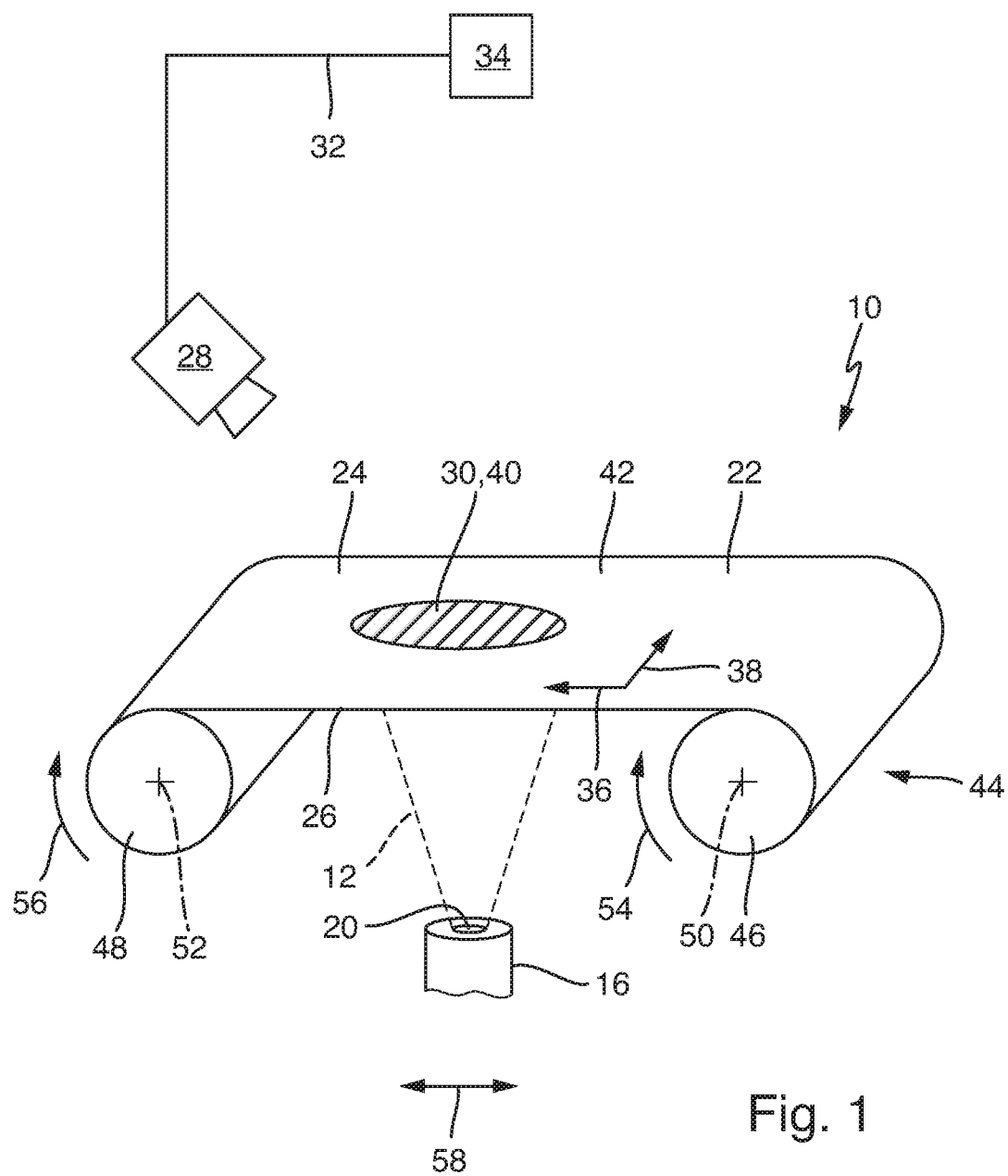
FIG. 1 is a schematic side view of a first embodiment of a device according to the invention for monitoring a state of a spray jet.
Figure 2:
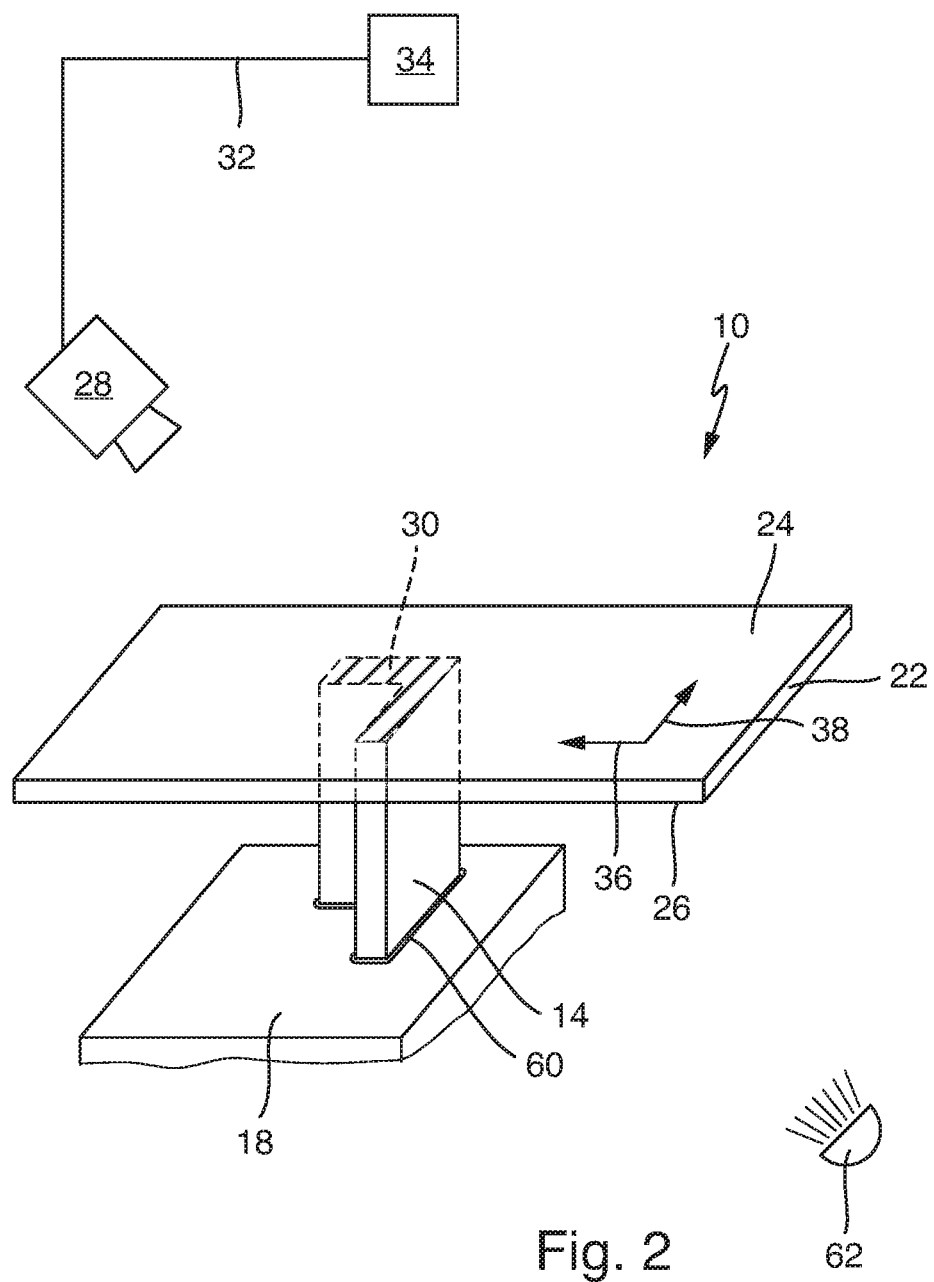
FIG. 2 is a schematic side view of a second embodiment of a device according to the invention for monitoring a state of a standing wave.

FIGS. 1 and 2 show two different embodiments of a device 10 according to the invention for monitoring a state of a spray jet 12 (cf. FIG. 1) and/or a standing wave 14 (cf. FIG. 2).

Elements which correspond in the figures are identified by corresponding reference numerals.

FIG. 1 is a schematic side view of a first embodiment of the device 10 which is designed to monitor a spray jet 12 of a flux nozzle 16. FIG. 2 is a schematic side view of a second embodiment of the device 10 which is designed to monitor a standing wave 14 of a soldering nozzle 18 of a soldering pot (not shown in the figures) for selective wave soldering.

As can be clearly seen in FIG. 1, the spray jet 12 leaves the flux nozzle 16 at a flux nozzle outlet 20 and then fans out in width. The first embodiment of the device 10 shown in FIG. 1 has a test surface 22 in the form of a tensioned paper web. The paper web 22 has an upper face 24 and a lower face 26.

The device 10 is overall designed in such a way that a shape and/or position of the spray jet 12 can be imaged on the upper face 24 of the paper web 22 by the spray jet 12 being brought into contact with the lower face 26 of the paper web 22. The device 10 further comprises a digital camera 28 arranged above the upper face 24 of the paper web 22, which digital camera is designed to detect the shape and/or position 30 of the spray jet 12 that is imaged on the upper face 24 of the paper web 22. It is conceivable for the shape and/or position 30 of the spray jet 12 that is detected by the digital camera 28 to be further processed by means of image processing in a control apparatus 34, for example in a control apparatus of a soldering system for selective wave soldering, which is connected to the digital camera 28 by a signal line 32, and for information about the state of the spray jet 12 to be output to an operator of the soldering system. A position of the spray jet 12 can in this case be detected in the direction of an X-axis 36 and in the direction of a Y-axis 38.

The paper of the paper web 22 is designed such that the shape and/or position 30 of the spray jet 12 is imaged on the upper face 24 of the paper web 22 by wetting the paper web 22 from the lower face 26 by means of the spray jet 12, by producing a color contrast between wetted regions 40 of the paper web 22 and unwetted regions 42 of the paper web 22. Advantageously, a paper is used which is not too light, but also not too dark. An absorbency and a thickness of the paper are also correspondingly selected. Blue paper and/or thermal paper is advantageously used. The use of blue paper has proven to be advantageous for producing a sufficient color contrast when the spray jet substantially comprises water. The use of thermal paper has proven to be advantageous when the spray jet comprises alcohol.

The device 10 shown in FIG. 1 has a winding apparatus 44 which comprises a first roller 46 and a second roller 48, between which the paper web 22 is tensioned such that the paper web 22 or the test surface 22 is planar and in particular arranged in a plane orthogonal to the direction of the spray jet 12 or to a central axis of the flux nozzle 16.

In order to drive at least one of the rollers 46, 48, an electric motor (not shown in the figures) is provided which is designed to drive at least one of the rollers 46, 48. "Driving" is in this case understood to mean a rotation of the rollers 46, 48 about their relevant central longitudinal axis 50, 52 in the direction of the arrows 54, 56. The electric motor is connected to the control apparatus 34, the control apparatus 34 controlling the electric motor such that the tension of the paper web 22 can be adjusted by means of the electric motor.

In this case it is conceivable for the paper web 22 to be unwound from the first roller 44 onto the second roller 46 or vice versa. It is also possible for an apparatus (not shown in the figures) to be provided which is designed to change a distance of the two preferably mutually parallel rollers in the direction of the double arrow 58 shown in FIG. 1 such that the tension of the paper web 22 can be adjusted. In this case it is conceivable for the apparatus to be designed to manually or automatically change the distance between the two rollers 46, 48.

The control apparatus 34 is designed to store a desired shape and/or a desired position of the spray jet 12. In addition, the control apparatus 34 is designed to compare the desired shape and/or desired position with the detected shape and/or position 30 of the spray jet 12. Therefore, when the detected shape and/or position deviates from the desired shape and/or desired position, corresponding information can be output to an operator of the device 10.

After completion of monitoring the spray jet 12, the flux nozzle 16 can be moved back from a test position into a working position, the paper web 22 then being wound further by means of the rollers 46, 48 such that only unwetted regions 42 of the paper web 22 are present between the rollers 46, 48, the wetted regions 40 disappearing from a field of view of the digital camera 28.

In the second embodiment of the device 10 shown in FIG. 2, corresponding elements are identified by corresponding reference numerals. In the embodiment in FIG. 2, the test surface 22 is in the form of a planar transparent plate, in particular a planar glass plate. The glass plate 22 in turn has an upper face 24 and a lower face 26.

The device 10 shown in FIG. 2 is designed in such a way that a shape and/or position 30 of the standing wave 14 which discharges out of the soldering nozzle 18 at a nozzle outlet 60 can be imaged on the upper face 24 of the glass plate 22 by the standing wave 14 being brought into contact with the lower face 26 of the glass plate 22. The device 10 likewise comprises a digital camera 28 arranged above the upper face 24 of the glass plate 22, which digital camera is designed to detect the shape and/or position 30 of the standing wave 16 that is imaged on the upper face of the glass plate 22. Furthermore, the device 10 comprises a lighting apparatus 62 in the form of a light in the edge region of the glass plate 22, which lighting apparatus lights the glass plate 22 from the lower face 26. Therefore, when monitoring the state of a standing solder wave 14, contours of the solder wave 14 (so-called coronas) can be made visible by the reflective solder of the solder wave 14 and the lighting apparatus 62.

The shape and/or position 30 of the standing wave 14 that is detected by the digital camera 28 can be further processed by means of image processing in a control apparatus 34, for example in a control apparatus of a soldering system for selective wave soldering, which is connected to the digital camera 28 by a signal line 32. Information about the state of the standing wave 14 can then be output to an operator of the soldering system. A position of the standing wave 14 can also be detected in the direction of an X-axis 36 and in the direction of a Y-axis 38.

The control apparatus 34 is designed to store a desired shape and/or a desired position of the standing wave 14. In addition, the control apparatus 34 is designed to compare the desired shape and/or desired position with the detected shape and/or position 30 of the standing wave 14. Therefore, when the detected shape and/or position 30 deviates from the desired shape and/or desired position, corresponding information can be output to an operator of the device 10.

Contamination or de-wetting of a soldering nozzle 18 can thus also be detected, for example. However, it is also possible to detect whether a soldering nozzle 18 is supplied with the pumping power provided for the soldering nozzle 18 and thus whether the predetermined height of the standing wave (14) is achieved.

The invention claimed is:
1. Soldering system for wave soldering, comprising at least one flux nozzle and a device for monitoring a state of a spray jet of the flux nozzle, characterized in that the device for monitoring the state of the spray jet has a test surface in the form of a tensioned paper web, wherein a winding apparatus is provided which comprises a first roller and a second roller, between which the paper web is tensioned, whereby the tensioned paper web has an upper face and a lower face and is designed such that a shape and/or position of the spray jet can be imaged on the upper face of the tensioned paper web by bringing the spray jet into contact with the lower face of the tensioned paper web, and in that a camera is provided which is arranged above the upper face of the test surface and is designed to detect the shape and/or position of the spray jet that is imaged on the upper face of the tensioned paper web.

2. Soldering system according to claim 1, wherein the test surface is planar.

3. Soldering system according to claim 1, wherein the paper of the paper web is designed such that at least one of the shape and position of the spray jet is imaged on the upper face of the paper web by wetting the paper web from the lower face by means of the spray jet, by producing a color contrast between wetted regions of the paper web and unwetted regions of the paper web.

4. Soldering system according to claim 1, wherein an electric motor is provided which is designed to drive at least one of the rollers.

5. Soldering system according to claim 1, wherein the device comprises a control apparatus which is designed to store at least one of a desired shape and a desired position of the spray jet and to store at least one of a desired shape and a desired position of a standing wave, wherein the control apparatus is designed to compare the at least one of desired shape and desired position with the at least one of detected shape and position of the spray jet and the standing wave.

6. Method for monitoring a state of at least one of a spray jet of a flux nozzle or a standing wave of soldering nozzle for selective wave soldering, comprising the following steps:

bringing into contact at least one of:
he spray jet with a lower face of a test surface in the form of a paper web, the paper web being tensioned between a first roller and a second roller, such that at least one of a shape and position of the spray jet is imaged on an upper face of the paper web;

and detecting by a camera at least one of:
the shape and position of the spray jet and
the standing wave that is imaged on the upper face of the test surface.

7. Method according to claim 6, wherein the at least one detected shape and position of the spray jet and the at least one of detected shape and position of the standing wave is compared with at least one of a desired shape and a desired position of the spray jet and the standing wave.

8. Method according to claim 6, wherein at least one of the shape and position of the spray jet is imaged on the upper face of the paper web by wetting the paper web from the lower face by means of the spray jet, by producing a color contrast between wetted regions of the paper web and unwetted regions of the paper web.

9. Method according to claim 6, wherein at least one of the flux nozzle and the soldering nozzle is moved from a working position into a test position for monitoring the state of at least one of the spray jet of the flux nozzle and the solder wave of the soldering nozzle.

* * * * *